US010397732B2

(12) United States Patent
Kalliovaara

(10) Patent No.: US 10,397,732 B2
(45) Date of Patent: Aug. 27, 2019

(54) POSITIONING TAG WITH ALERT FUNCTION

(71) Applicants: AiRISTA Flow, Inc., Newark, DE (US); AiRISTA International Oy, Helsinki (FI)

(72) Inventor: Timo Kalliovaara, Espoo (FI)

(73) Assignees: Airista Flow, Inc., Newark, DE (US); Airista International Oy, Helsinki (FI)

(*) Notice: Subject to any disclaimer, the term of this patent is extended or adjusted under 35 U.S.C. 154(b) by 0 days.

(21) Appl. No.: 13/803,674

(22) Filed: Mar. 14, 2013

(65) Prior Publication Data
US 2014/0273917 A1  Sep. 18, 2014

(51) Int. Cl.
H04M 11/04 (2006.01)
H04W 4/02 (2018.01)
H04W 4/80 (2018.01)

(52) U.S. Cl.
CPC .............. H04W 4/02 (2013.01); H04W 4/80 (2018.02)

(58) Field of Classification Search
CPC ....................................... H04W 4/02
USPC .................... 455/404.2; 340/539.13
See application file for complete search history.

(56) References Cited

U.S. PATENT DOCUMENTS

| 4,158,197 A * | 6/1979 | Takagaki | G08S 15/004 340/514 |
| 4,692,749 A * | 9/1987 | Bussing, Jr. | G08S 21/0297 340/574 |
| 4,952,913 A * | 8/1990 | Pauley et al. | 340/573.4 |
| 5,485,163 A * | 1/1996 | Singer | G01S 5/0054 340/7.27 |
| 5,742,233 A * | 4/1998 | Hoffman | G08S 21/023 340/10.41 |
| 5,841,352 A * | 11/1998 | Prakash | 340/573.4 |
| 5,900,817 A * | 5/1999 | Olmassakian | 340/573.1 |
| 6,133,831 A * | 10/2000 | Kyles | A45C 13/24 340/568.1 |
| 6,236,319 B1 * | 5/2001 | Pitzer et al. | 340/573.4 |
| 6,275,164 B1 * | 8/2001 | MacConnell | G01S 5/0027 340/573.1 |
| 6,304,183 B1 * | 10/2001 | Causey | G08S 21/0216 340/539.1 |

(Continued)

FOREIGN PATENT DOCUMENTS

| GB | 2285878 A * | 7/1995 | G08B 21/0297 |
| GB | 2420209 A * | 5/2006 | A45C 13/22 |

(Continued)

Primary Examiner — Charles T Shedrick
(74) Attorney, Agent, or Firm — Timothy W. Menasco, Esq.; Harter Secrest & Emery LLP

(57) ABSTRACT

A mobile data processing device configured to assist in locating a user. The device comprises an enclosure and an attachment base for attaching the device to a garment, lanyard or strap wearable by a user. The attachment base moves between a first ("normal") position and a second ("alert") position with respect to the enclosure in response to an external force acting on the enclosure. The device further comprises a detector system for detecting removal of the attachment base from the normal position, and an alert signal generator configured to send an alert signal in response to said detection. The alert signal can be generated quickly by grabbing the enclosure and pulling the device downwards.

19 Claims, 6 Drawing Sheets

(56) References Cited

U.S. PATENT DOCUMENTS

| | | | | |
|---|---|---|---|---|
| 6,593,851 | B1* | 7/2003 | Bornstein | G08S 21/0227 340/539.15 |
| 6,720,881 | B1* | 4/2004 | Halliday | 340/573.4 |
| 7,453,364 | B2* | 11/2008 | Sarel et al. | 340/573.1 |
| 7,554,453 | B2* | 6/2009 | Snyder et al. | 340/604 |
| 7,825,794 | B2* | 11/2010 | Janetis | G01S 5/0027 340/539.13 |
| 8,618,930 | B2* | 12/2013 | Papadopoulos et al. | 340/539.12 |
| 2001/0026240 | A1* | 10/2001 | Neher | G01S 5/0018 342/357.75 |
| 2003/0218539 | A1* | 11/2003 | Hight | 340/539.13 |
| 2004/0012495 | A1* | 1/2004 | Hammond | G08S 13/1427 340/568.7 |
| 2004/0121822 | A1* | 6/2004 | Kartchner | G01S 5/0072 455/574 |
| 2005/0014482 | A1* | 1/2005 | Holland | G01S 5/0027 455/404.1 |
| 2005/0073439 | A1* | 4/2005 | Perricone | 340/945 |
| 2005/0075116 | A1* | 4/2005 | Laird | A61B 5/04 455/456.3 |
| 2005/0093709 | A1* | 5/2005 | Franco et al. | 340/686.1 |
| 2005/0136885 | A1* | 6/2005 | Kaltsukis | H04M 3/56 455/404.1 |
| 2009/0109027 | A1* | 4/2009 | Schuller | 340/568.1 |
| 2009/0180355 | A1* | 7/2009 | Cartwright | 368/12 |
| 2011/0288380 | A1* | 11/2011 | Inciardi et al. | 600/301 |
| 2012/0108215 | A1* | 5/2012 | Kameli | 455/412.2 |
| 2012/0146797 | A1* | 6/2012 | Oskin et al. | 340/573.1 |
| 2012/0238319 | A1* | 9/2012 | Lake | 455/556.1 |
| 2012/0293323 | A1* | 11/2012 | Kaib et al. | 340/539.12 |
| 2013/0143519 | A1* | 6/2013 | Doezema | 455/404.2 |
| 2015/0123785 | A1* | 5/2015 | Haflinger | A61B 5/6831 340/539.11 |

FOREIGN PATENT DOCUMENTS

| | | |
|---|---|---|
| WO | 2009122000 A1 | 10/2009 |
| WO | 2011058228 A1 | 5/2011 |

\* cited by examiner

POSITIONING TAG WITH ALERT FUNCTION

FIELD OF THE INVENTION

The present invention relates generally to techniques for positioning a portable device and generating an alert signal in case of distress or emergency.

BACKGROUND OF THE INVENTION

Smartphones typically include GPS (Global Positioning System) circuitry. The GPS circuitry of modern smartphones may be sufficiently sensitive to determine the smartphone's location inside buildings. Unfortunately the accuracy of GPS inside buildings is poor. This is because GPS positioning is based on travel time differences from a number of satellites, and when all the satellites are received through the same window, the travel time differences are the same regardless of the smartphone's position within the building.

In order to track the location of persons in places where GPS positioning is insufficient, it is customary to use positioning devices that is based on signals whose one or more parameters depend from the position of the device in a known or predictable manner. For instance, such positioning may be based on radio signal strength or quality observations. In some implementations a positioning device observes signal parameters, such as strength or quality, from various radio beacons, such as WLAN (wireless local-area network) access points or dedicated positioning transmitters. These observations are then used, either in the device itself or in an external positioning engine, to determine the device's position. In other implementations the scheme is reversed and the fixed stations observe a signal transmitted by the device to be positioned. Alternatively or additionally, signal content may be used. For instance, detection of a specific transmitter's carrier signal is in itself a useful indicator of position, regardless of the strength or quality of that signal. Detection of a transmitter's identity may be sufficient for positioning the device in cases wherein the transmitter's signal cannot propagate through walls. Visible light, infrared radiation, microwave radiation and ultrasound are examples of signals that are practically confined to the spaces in which they are transmitted, and serve as indicators of the device's presence in the respective spaces.

It is customary to use the term "tag" or "positioning tag" to mean a positioning device whose sole or primary purpose is to keep track of a person or object the tag is attached to. Such positioning techniques and tags are well known in the art and can be obtained from a number of sources, including the assignee of the invention described later in this document.

A residual problem in existing positioning tags relates to generation of an alert signal in case of distress or emergency. For instance, commonly-owned PCT application WO2009/122000 describes, in connection with FIG. 9, a positioning tag with a push button for triggering an alert condition. In the prior art systems, the wearer of the positioning tag needs time to find the alert button. If the person is using protective gloves or mittens, it may be impossible to press a small button.

SUMMARY OF THE INVENTION

It is an object of the present invention to alleviate at least one problem relating to generation of an alert signal from a positioning tag in case of distress or emergency.

In one implementation the invention is a mobile data processing device, which comprises an enclosure and a power source; a memory system for storing program instructions; a processing system for executing the program instructions; a transmission system for communicating with at least one communication system, wherein the at least one communication system comprises or cooperates with a positioning system for positioning the mobile data processing device. The functionality listed in the preceding sentence is well known in the art, and illustrative reference documents are listed at the end of this description.

In order to improve alert signal generation, the transmission system is configured to send at least one alert signal in response to fulfillment of a first set of predetermined alert conditions. The first set of alert conditions may optionally include pressing a button. But finding a button in an emergency may take time. To alleviate this problem, the mobile data processing device comprises an attachment base for attaching the mobile data processing device to a garment, lanyard or strap that is wearable by a user. The attachment base is configured to move between a first position (normal position) and a second position (alert position) with respect to the enclosure in response to an external force. The external force is conveniently exerted by pulling the enclosure against the attachment base, which is attached to the user's clothing, belt or lanyard. When the mobile data processing device is suspended from the attachment base, a force exceeding a threshold and pulling the enclosure downwards moves the attachment base to the second position with respect to the enclosure. The mobile data processing device also comprises a detector system for detecting presence of the attachment base in the second position (alert position). The mobile data processing device further comprises an alert signal generator having an input coupled to the detector system and an output coupled to the transmission system, wherein the alert signal generator is configured to cause transmission of at least one alert signal in response to a detected presence of the attachment base in the second position.

In some implementations the mobile data processing device comprising a reception system for receiving messages and, optionally, a display system for displaying the received messages.

To maximize battery life the mobile data processing device may comprise a sleep mode circuitry for putting the mobile data processing device to a power save mode in response to fulfillment of a second set of predetermined conditions, such as passage of time since last detected activity, lack of user motion, and/or activation of a sleep mode user interface element, eg a button. If the mobile data processing device comprises the sleep mode circuitry, it should also comprise a wake-up circuitry for putting the mobile data processing device to active mode in response to fulfillment of a third set of predetermined conditions, such as periodically and/or in response to detection of user motion. The sleep mode circuitry, if implemented, is configured to control power to the reception system, wherein after sending the at least one alert signal, the sleep mode circuitry keeps the reception system powered until an acknowledgement to the at least one alert signal is received.

In some implementations the mobile data processing device with the attachment base in the first (normal) position is visually different from the mobile data processing device with the attachment base in the second (alert) position.

In order to ensure that users with relatively small hands can grab the enclosure and pull it against the attachment base, the enclosure, when suspended from the attachment base, should have a horizontal width of not more than 10 cm. In order to secure a good grip, the enclosure, when suspended from the attachment base, has a horizontal width of not less than 4 cm.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 1A:
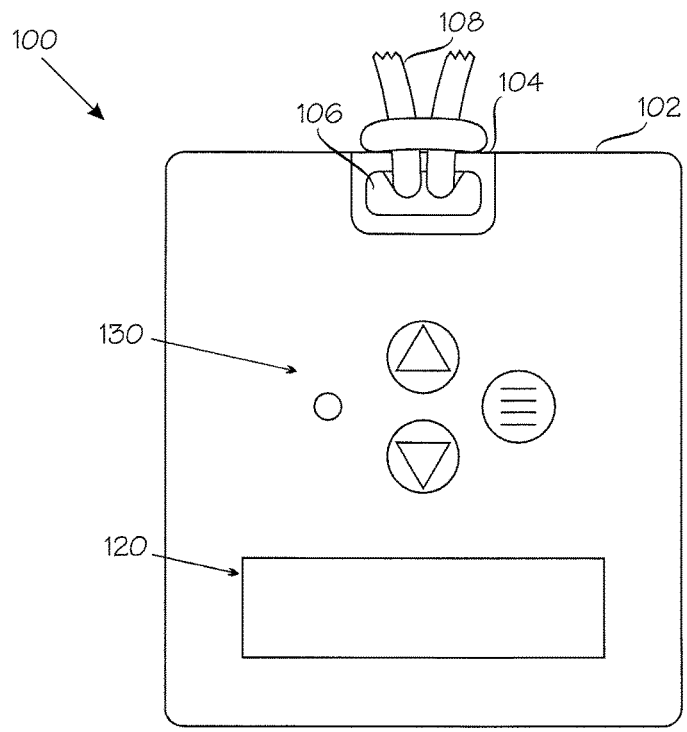
FIG. 1A presents an overview of a positioning tag with an alert function.

FIG. 1A presents an overview of a positioning tag 100 with an alert function. The positioning tag 100 has an enclosure 102. The enclosure contains the normal elements of a positioning tag, as explained in more detail in the prior art. The normal elements include electronic circuitry, which will be described in more detail in connection with FIG. 2, and user interface elements, which in the present example include a display 120 and keypad 130.

For the purposes of the present invention, the positioning tag 100 comprises an attachment base 104, which has a formation 106 for attachment to the user. In the present example, the formation 106 is a hole and the attachment to the user or the user's clothing takes place by means of a lanyard 108. In a typical use case, the positioning tag may be suspended form the lanyard which is carried around the user's neck. Alternatively the attachment base 104 and the formation 106 may be attached to a hook or shackle supported by the user's belt. In yet further implementations the formation 106 may comprise a hook or shackle which is clipped to a lanyard, buttonhole or belt of the user.

In FIG. 1A the positioning tag is shown in a normal position, in a condition wherein the user has remained motionless for a time which is deemed sufficient to place the positioning tag in a sleep or power down mode. In the sleep mode, non-critical functions are powered down, which is indicated herein by the fact that the display is shut off. The attachment base 104 is in a first position, which is it's normal position.

Figure 1B:
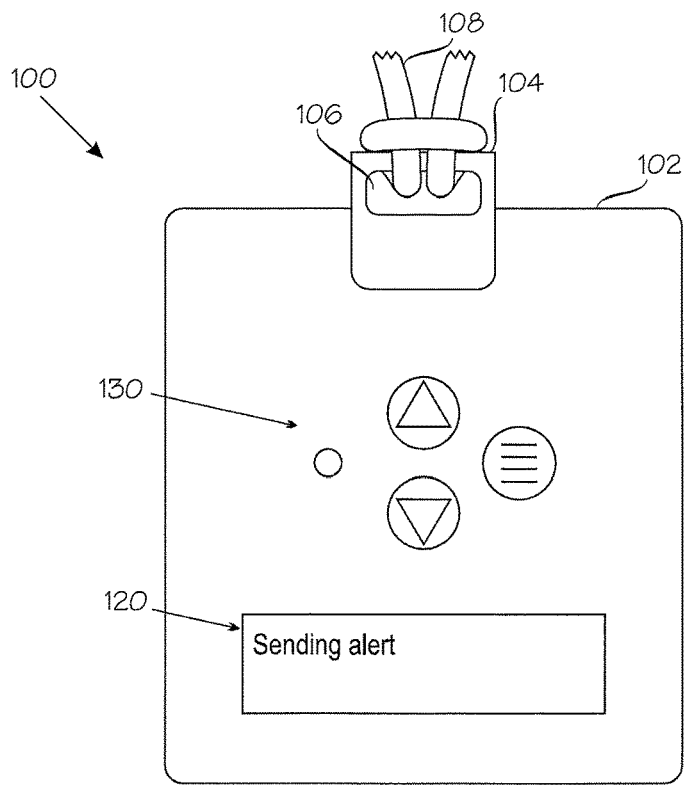
FIG. 1B shows the positioning tag in an alert condition.

FIG. 1B shows the positioning tag in an alert condition. The positioning tag has been pulled against the lanyard 108 (or other means of attachment) with a sufficient force to move the attachment base 104 to a second position with respect to the enclosure 102. The second position is called alert position. The electronic circuitry, which will be described in more detail later, detects the movement of the attachment base 104 to the alert position and responds by ensuring that the positioning tag is powered up and by sending an alert signal.

Figure 2:
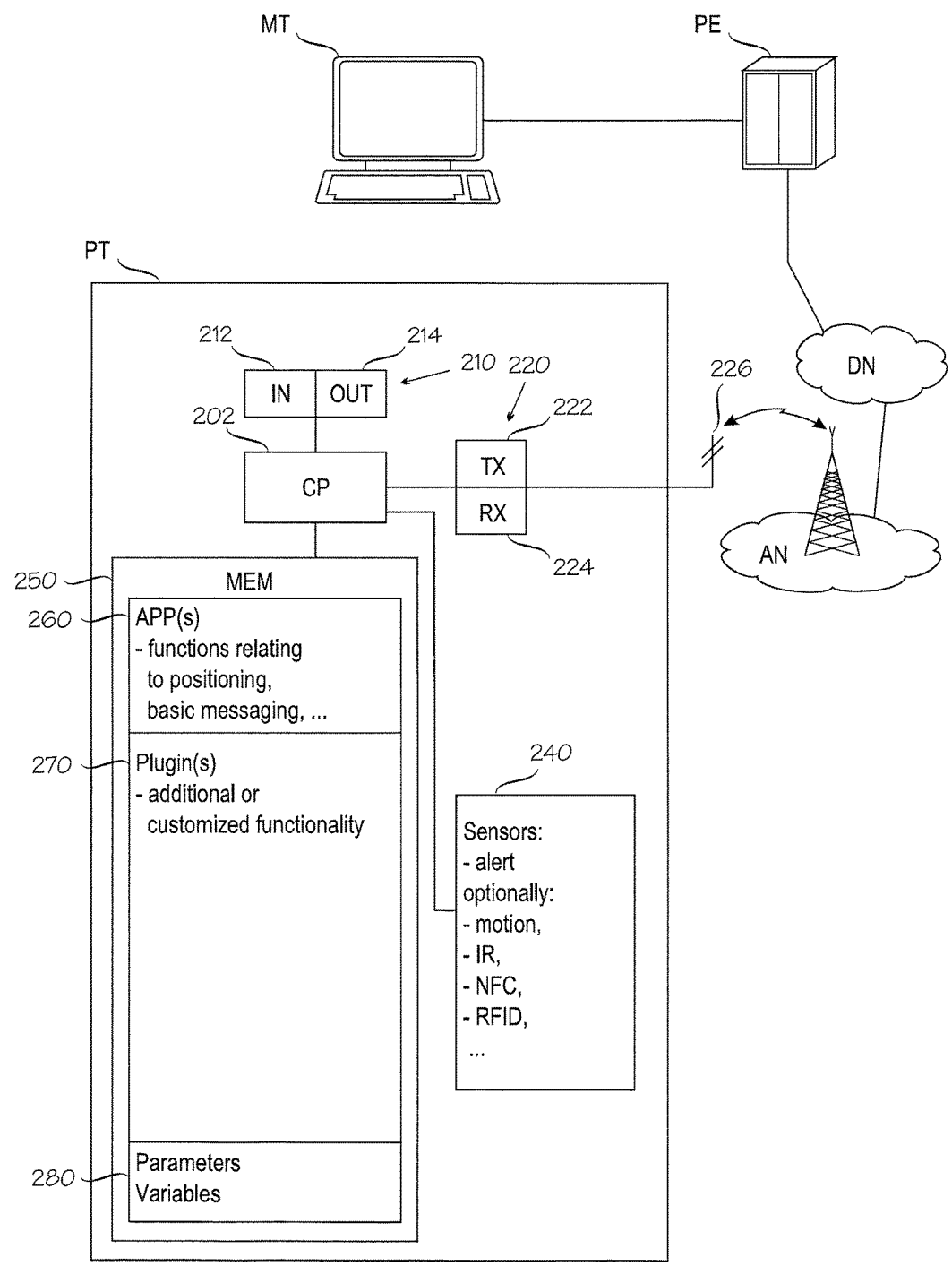
FIG. 2 shows a schematic block diagram of a mobile data processing device configured to act as a positioning tag with an alert function.

FIG. 2 shows a schematic block diagram of a mobile data processing device configured to act as a positioning tag with an alert function. The positioning tag, denoted by reference sign PT, comprises a processing system 202 with at least one central processing unit. The positioning tag further comprises a memory system 250, which typically comprises a combination of fast volatile memory and slower non-volatile memory, as is well known to those skilled in the art. In addition, the positioning tag PT may comprise or utilize a user interface 210, which comprises an input circuitry 212 and an output circuitry 214. The input circuitry 212 comprises the positioning tag's user-input devices, such as a keypad. The output circuitry 214 comprises the positioning tag's audio and/or visual output devices, such as a text display, light indicator(s) and/or sound output device(s). The positioning tag PT further comprises reception/transmission circuitry 220 which comprises a transmission circuitry 222, reception circuitry 224 and antenna 226 for at least one communication technology. A typical example of an appropriate communication technology is WLAN (Wireless Local Area Network). A WLAN network is a typical but non-restrictive example of access networks AN which support wireless mobility of the positioning tags. The access network AN is typically coupled via a data network, such as a LAN (Local Area Network) to a positioning engine PE and a monitoring terminal MT. The reception/transmission circuitry 220 typically contains signal strength or quality sensors, such as an RSSI (received signal strength indicator) sensor. In some implementations the observations of the RSSI sensor are utilized to determine the location of the positioning tag.

The positioning tag's memory 250 comprises routines for controlling the operations of the processing system 202 which, in turn, controls the operations of the entire positioning tag. FIG. 2 shows an arrangement in which the memory 250 of the positioning tag stores apps (applications) 260 for execution by the central processing unit CP. Reference numeral 280 denotes an area of the memory 250 used to store parameters and temporary variables.

In addition to the user interface 210, the positioning tag comprises various sensors, collectively denoted by reference number 240. For the purposes of the present invention, one of the sensors is an alert sensor that detects the placement of the attachment base 104 in the second position that corresponds to the alert condition. The sensor assembly 240 may comprise optional sensors for detecting environmental variables or parameters. A non-exhaustive list of sensors 240 includes IR (infrared) detection/communication circuitry, GPS and/or other location-determination circuitry, RFID (radio frequency identification) and/or NFC (near-field communication) circuitry, or the like, by means of which location determination of the positioning tag can be accomplished or enhanced.

The enclosure naturally comprises a power supply (not shown separately), such as a battery. In order to minimize energy consumption and maximize battery life, the positioning tag may comprise sleep mode circuitry, which puts the positioning tag to a power save mode when it encounters a predetermined set of conditions. In the power save mode, non-critical functions are powered down, such as the display and communications functions.

The sensor assembly 240 typically comprises a motion sensor, which is used in combination with a set of timers. In a typical implementation, the power save mode is entered when the positioning tag has remained motionless for a period of time. In the present context, motionless means that the user's movement, and that of the positioning tag, is systematic and exceeds slight variations in sitting position. In a typical implementation, the positioning tag also has wake-up circuitry to take the positioning tag out of the power save mode on detection of another predetermined set of conditions. In a typical implementation, the power save mode is terminated on detection of movement exceeding slight variations in sitting position and/or periodically, whereby the positioning engine may confirm that the positioning tag remains functional even if it is not in motion.

One function that should not be powered off is naturally the alert function. Even if much of the positioning tag is in the power save mode, the alert detection should remain active and able to bring the positioning tag to full functionality. Also, when the alert condition has been detected and the alert signal has been transmitted, the communications functions should be kept active until an acknowledgement is received and displayed on the positioning tag's display or other indicator.

Figure 3A:
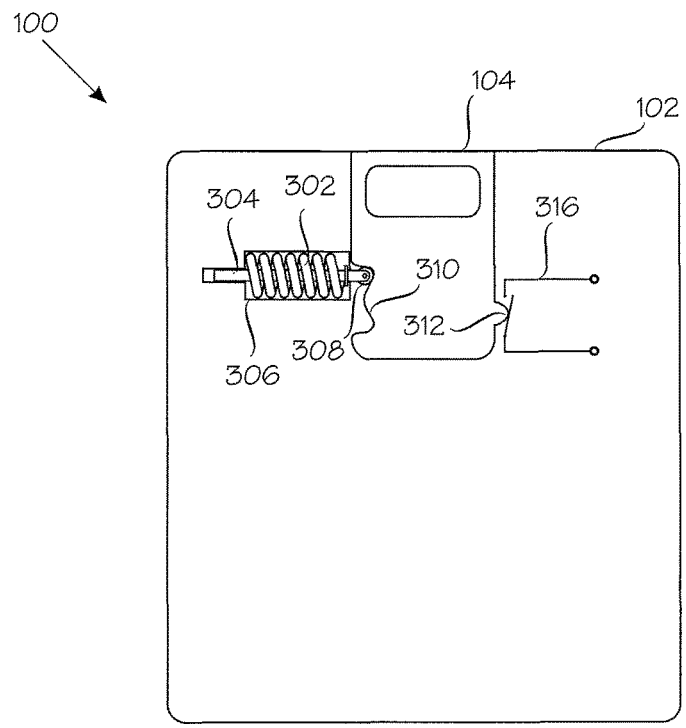
FIGS. 3A and 3B illustrate one specific implementation for detecting movement of the attachment base into the alert position.
Figure 3B:
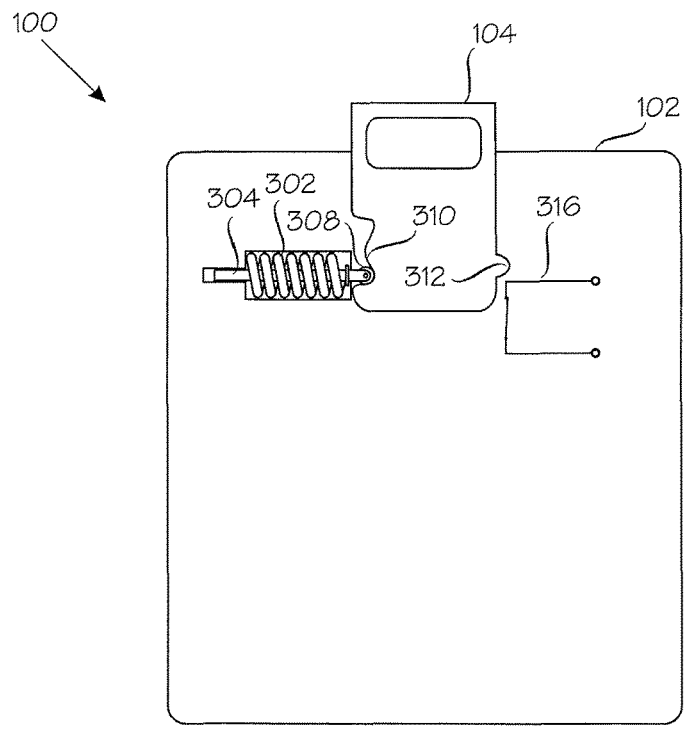

FIGS. 3A and 3B illustrate one specific implementation for detecting movement of the attachment base into the alert position. FIG. 3A shows the attachment base 104 in the normal position and FIG. 3B in the alert position. In the present illustrative example, the attachment base 104 has formation 310, against which an external force is exerted, in this example by a tip or wheel 308, which is pushed against the attachment base 104 by a shaft 304 and spring 302. In the present example, the formation 310 in the attachment base 104 is shaped in such a manner that the spring 302 has two energy minima, one corresponding to the normal position and the other to the alert position. A benefit of this arrangement is that the energy minima resist pulling of the attachment base towards the alert position by a force which is sufficient for preventing accidental alerts.

In order to detect movement of the attachment base into the alert position, the present implementation comprises a switch 316 which is guided by a second formation 312 of the attachment base 104. In the implementation shown in FIGS. 3A and 3B, the switch 316 is of a normally closed (NC) type, and it is held in the open (non-connecting) state by the formation 312 of the attachment base 104. In the alert position shown in FIG. 3B the formation 312 no longer prevents the switch 316 from closing. Closure of the switch 316 is detected by the electronic circuitry, which responds by ensuring that the positioning tag is powered up and by sending an alert signal. A benefit of using an NC-type switch is that complete detachment of the attachment base 104 from the enclosure 102 results in continuous detection of the alert condition. The attachment base preferably resists complete detachment from the enclosure by a force which is sufficient to prevent accidental breaking of the positioning tag, yet not strong enough to allow serious injury to the user in cases where the positioning tag is accidentally caught in an obstacle, or an attacker grabs it. In the examples shown in FIGS. 3A and 3B, when an overly strong force pulls the attachment base away from the enclosure, either the tip or wheel 308 breaks or the formation 310 in the attachment breaks. In either case the attachment base detaches without serious injury to the user.

Figure 4A:
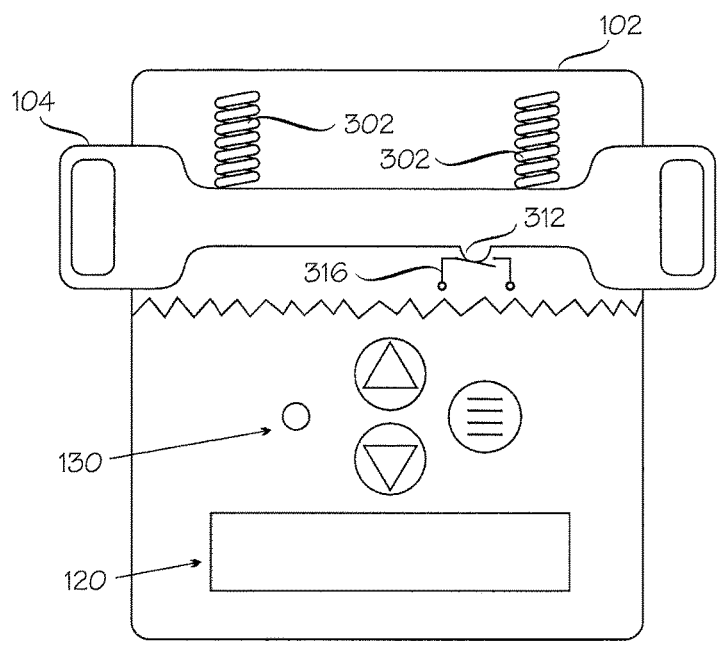
FIGS. 4A and 4B illustrate another illustrative implementation for detecting movement of the attachment base into the alert position.
Figure 4B:
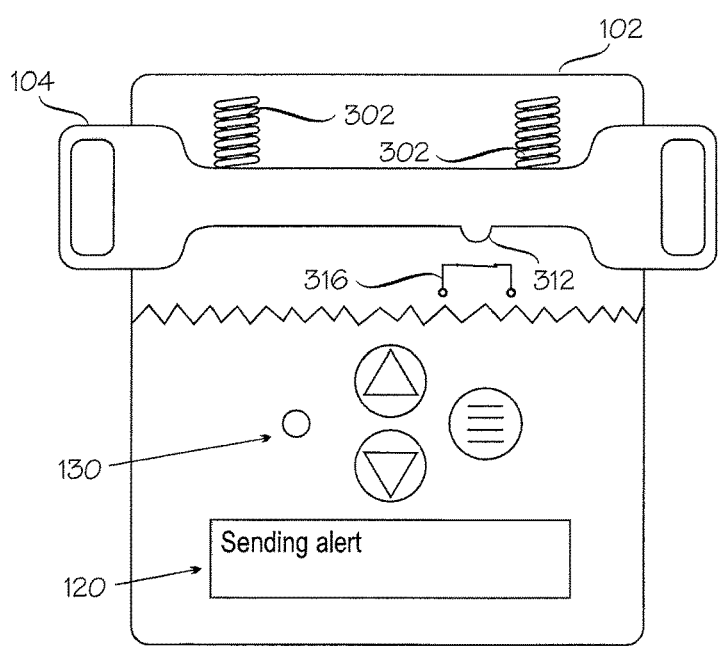

FIGS. 4A and 4B show another illustrative example. In this example, the attachment base 104 extends across the enclosure 102 and does not slide "out of" and "into" the enclosure 102. Similarly to the previous example, an NC switch 316 is kept in an open (non-alert) state by a formation 312 in the attachment base. The attachment base 104 is kept in the first (normal) position by one or more springs 302. In the situation shown in FIG. 4B the enclosure 102 is pulled against the attachment base 104 by a force sufficient for the spring(s) 302 to compress such that the switch 316 closes and triggers the alert.

Figure 5:
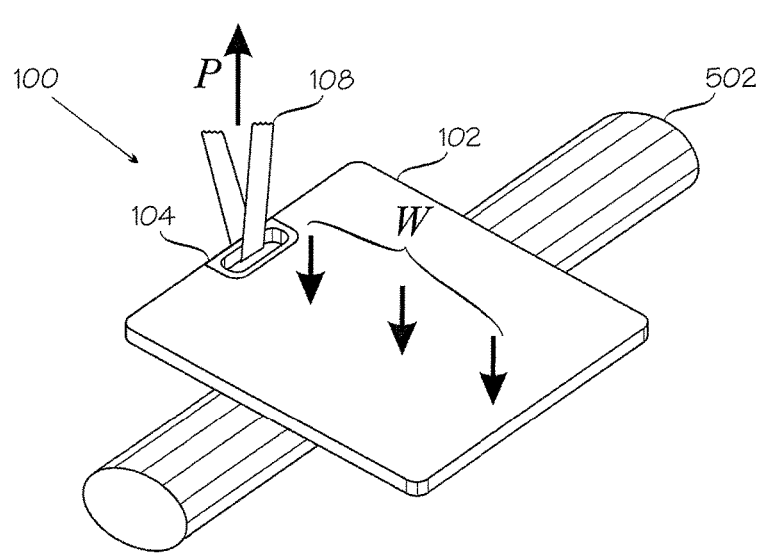
FIG. 5 illustrates a residual problem relating to forces acting on the positioning tag.

FIG. 5 illustrates a residual problem relating to forces acting on the positioning device. In the scenario shown in FIG. 5 the positioning tag 100 lies against an obstacle 502, such a rail of a hospital bed. A part of the user's weight imposes a force W on the enclosure 102 against the relatively sharp rail 502. The user, who may be assisting a patient, raises their head, which imposes a pulling force P on the attachment base 104 via the lanyard 108. This is a representative example of situations which have caused breakages and/or false alarms in prior art positioning tags. For instance, if the force P has a component that tends to pull the attachment base 104 towards the alert position, a false alert may be triggered although the user may not be aware of the generated alert signal. And if the force P has a component perpendicular to the face (largest surface) of the enclosure 102, the force P tends to pull the front and rear halves of the enclosure apart from each other. Or, the force P may result in misalignment of the switch 312 and the formation 316 that presses against the switch, which may also cause false alarms.

The inventors have discovered that it is beneficial to dimension the structural elements (wall thicknesses, material rigidity, joint strengths) in such a manner that the positioning tag 100 withstands, without breaking or detecting removal of the attachment base from the first position, a force P of at least 150 N, wherein the force P acts on the attachment base 104, in parallel with the normal of the face (the largest surface) of the positioning tag, when a corresponding counterforce W acts on the face of the positioning tag. Experience has shown that the counterforce W is usually fairly evenly-distributed, as it is typically caused by the user's weight.

Figure 6:
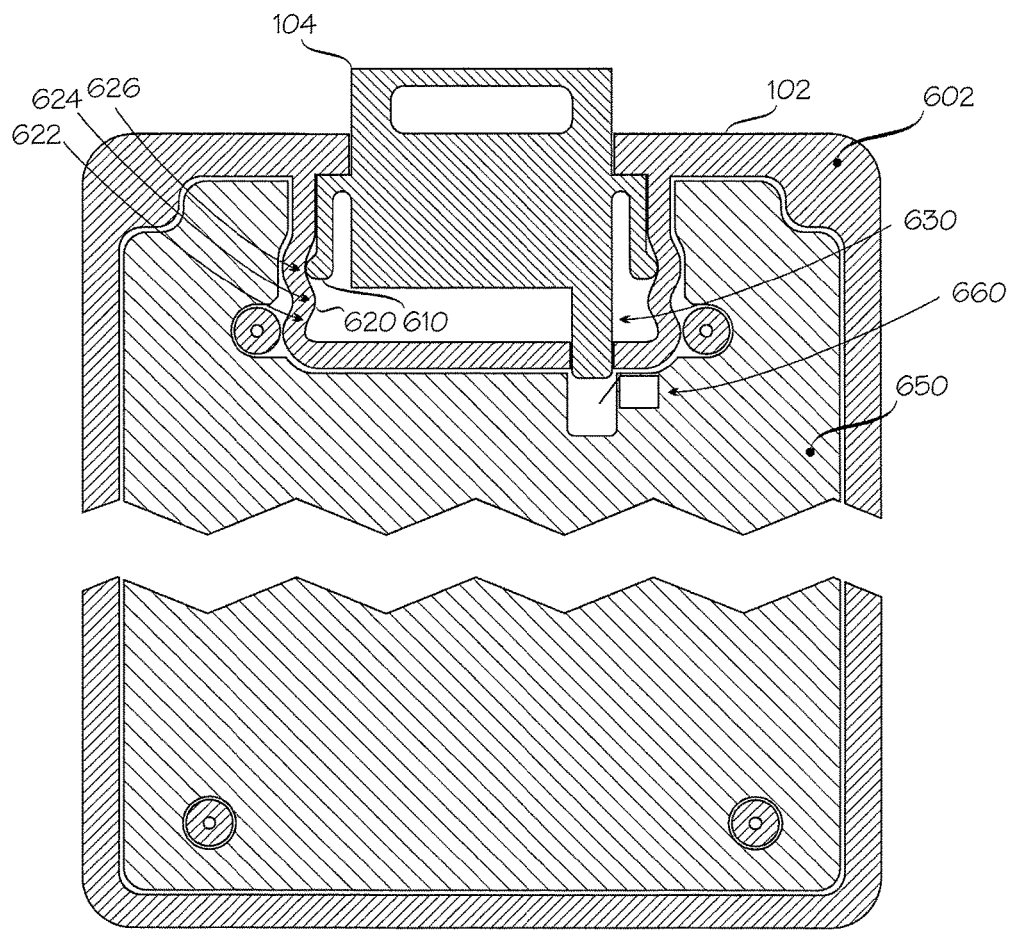
FIG. 6 illustrates exemplary optional features directed to solving the force-related problems discussed in connection with FIG. 5.

FIG. 6 illustrates exemplary optional features directed to solving the force-related problems discussed in connection with FIG. 5. In order to alleviate or eliminate the problems discussed in connection with FIG. 5, the embodiment shown in FIG. 6 contains some improvements over the previous embodiments. For instance, the front and rear halves of the enclosure, denoted here by reference number 602, are very strongly joined with each other. The hatched areas in the enclosure 602, indicate areas in which the front and rear halves are joined with each other. Applicable techniques include ultrasonic welding, gluing, screwing, riveting and combinations thereof, to name just a few examples. Ultrasonic welding and gluing are very effective techniques, because large areas contribute to sharing the loads.

As stated in connection with FIG. 5, one of the residual problems in prior art positioning tags was the possibility to trigger false alerts in situations where a force P accidentally acted on the attachment base 104. In order to further reduce the risk of false alerts, the embodiment shown in FIG. 6 is constructed in such a manner that generation of alerts, be they triggered on purposed or by accident, causes a clear visual change in the appearance of the positioning tag. In the present embodiment the attachment base has an energy maximum (a peak) between the first (normal) and second (alert) positions, and the alert detection system is dimensioned in such a manner that the alert condition is detected only after the attachment base has moved from the normal position beyond the energy maximum towards the alert position. Because the attachment base 104 has to proceed beyond the energy maximum towards an energy minimum (at least a local one), it is simply impossible for the attachment base to move to a position in which a false alert is generated and then spontaneously to return to the normal position, without any visual indication of the alert condition to the user.

In the present embodiment this scheme is implemented as follows. Reference number 620 denotes a formation in the enclosure, which simultaneously contributes to two aspects by which the number of false alerts can be reduced. Firstly, the attachment base 104 has at least one (two are shown) spring-loaded tips 610, which press against the formation 620. The formation 620 has two troughs 622 and 626, such that the presence of the spring-loaded tip(s) 610 in the first trough 622 corresponds to the normal position, and the presence of the spring-loaded tip(s) 610 in the second trough 624 corresponds to the alert position. The two troughs 622, 626 constitute local energy minima for the spring-loaded tip(s) 610. Between the troughs there is a peak 624, which constitutes a local energy maximum for each tip 610. Secondly, the formation 620 contributes to joining of the front and rear halves of the enclosure 102 close the attachment base 104, that is, exactly where strength against distorting forces are needed.

In the present embodiment, the attachment base 104 presses against a micro switch 660, which acts as the primary alert-detection sensor, by means of an elongated shaft 630 through the formation 620. The micro switch 660 is located on an circuit board 650, while the attachment base 104 is on the opposite side of the formation, as seen from the circuit board. An implementation wherein the elongated shaft 630 penetrates the formation 620 to act on the micro switch 660 has the benefit that all electronic components, including the micro switch 660, can be installed on the circuit board 650, and yet the formation 620 that separates the circuit board from the attachment base can contribute to the strength of the enclosure.

An obvious way to influence a sensor located on the circuit board is to use a Hall-effect sensor on the circuit board and a magnet in the attachment base. The inventors have discovered, however, that Hall-effect sensors can be influenced by external magnets, such as magnets of neighboring positioning tags when the tags are stacked on top of one another. In other words, false alerts could result from brining multiple tags too close to each other.

Figure 7A:
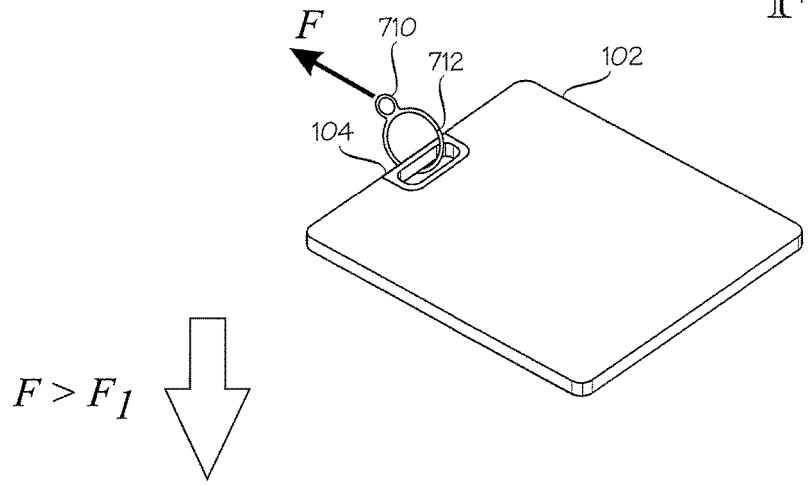
FIGS. 7A, 7B and 7C illustrate successive states of a positioning tag according to an embodiment, with an increasing force F acting on the attachment base.
Figure 7B:
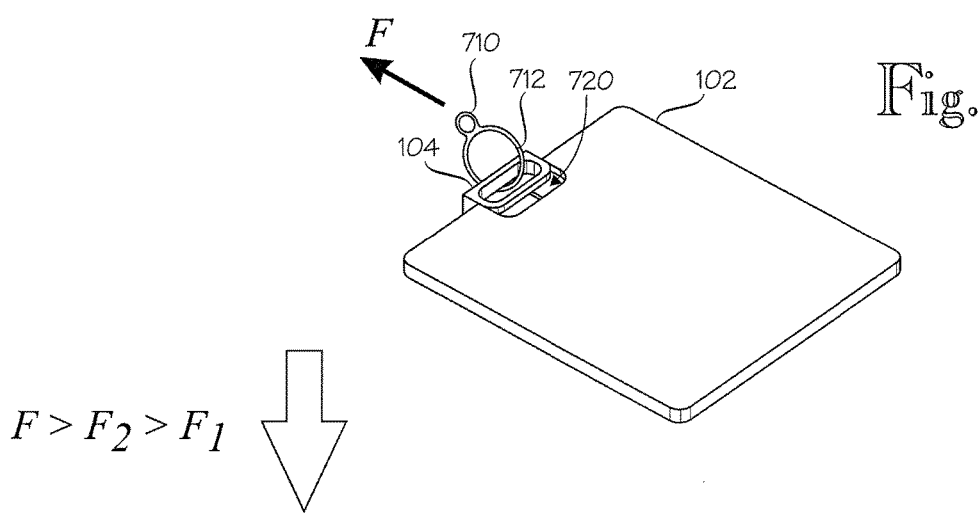
Figure 7C:
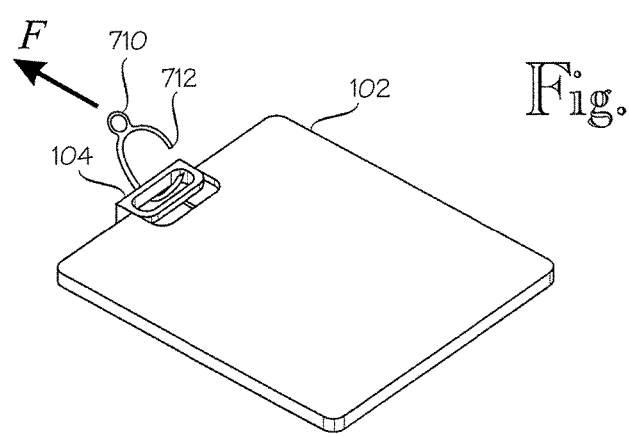

FIGS. 7A, 7B and 7C illustrate successive states of a tag according to an embodiment, with an increasing force F acting on the attachment base 104. In this embodiment, the attachment base 104 connects to the lanyard 108 (see FIGS. 1A, 1B) via a clip or shackle 710. The clip 710 has a latch 712 which is configured to open when a force F exceeds a given threshold, wherein the force F pulls the attachment base 104 away from the enclosure 102 of the tag. FIG. 7A shows a normal state in which the tag hangs freely from the clip 710 and lanyard (omitted here for clarity). When the force F exceeds a first threshold force $F_1$, the attachment base 104 moves with respect to the enclosure 102. This state is shown in FIG. 7B. The tag detects the movement which indicates an alert condition, and sends an alert signal. When the force F is further increased beyond a second threshold force $F_2$, which is higher than the first threshold force $F_1$, the latch 712 opens and the entire tag is detached from the lanyard. This state is shown in FIG. 7C. A benefit of this feature is reduced risk of physical harm to the user in case of attacks on the user.

In the embodiments shown in the drawings, the first force threshold which must be exceeded to generate an alert signal, is caused by the spring(s) 302 in FIGS. 3A, 3B, 4A and 4B. Those skilled in the art will realized that helical springs are graphical symbols for elastic elements, but the threshold $F_1$ can be attained by a variety of alternative implementations. For instance, other forms of springs, besides helical springs, can be used. Instead of springs, blocks of elastic material can be used. As a yet further alternative, the attachment based 104 may be drawn towards its normal position by magnets (not shown), whose separation from one another requires a force F exceeding the first force threshold $F_1$.

In FIGS. 7A, 7B and 7C, the latch 712 is shown as a feature of a separate clip, but it is possible to integrate the latch with the attachment base. Alternatively, the tag, and particularly the connection of the attachment base and the enclosure, can be dimensioned in such a manner that the attachment base is entirely detached from the enclosure when the second threshold force $F_2$ is exceeded.

The preceding discussion relates to a force F acting to detach the attachment base 104 from the enclosure 102. According to a further beneficial feature, the attachment base 104 and enclosure 102 comprise a motion stopper, depicted by reference number 720, which resists pushing the attachment base 104 towards its normal (non-alert) position and beyond. In the implementation shown in FIG. 7B, the motion stopper 720 comprises a butt joint between the attachment base 104 and enclosure 102.

The inventors have discovered that the first force threshold $F_1$, which must be exceeded to detect the alert condition and trigger the alert signal, is preferably about 15-35 N, and optimally about 24 N, to prevent false alerts.

The second threshold force $F_2$, which must be exceeded to completely detach the tag from the lanyard or other support, should be higher than the first force threshold $F_1$, preferably about 40-60 N and optimally about 50 N. This dimensioning ensures that the alert condition is detected before the tag is detached from the lanyard or other support.

The second threshold force $F_2$ should also be less than 120 N, preferably about 60-100 N and optimally about 80 N, to avoid injury to the personnel in case of attack.

The enclosure and attachment base should be dimensioned to withstand all of the above forces, that is, any forces up to the one by which the tag is detached from the lanyard or other support.

Finally, the enclosure and attachment base should be dimensioned to withstand a force of about 100 N, which pushes the attachment base towards its normal position. This feature reduces the risk of damage to the mechanism and/or the detector (item 316 in FIGS. 3A, 3B, 4A and 4B), if excessive force is used to push the attachment base to the normal position.

Those skilled in the art will realize that the inventive principle may be modified in various ways without departing from the spirit and scope of the present invention.

COMMONLY-OWNED PATENT APPLICATIONS

WO2009/122000A1
WO2011/058228A1
These are illustrative but non-exhaustive examples of documents describing positioning functionality of positioning tags.

I claim:

1. A mobile data processing device, comprising:
an enclosure and a power source, the enclosure comprising at least one formation, each of the at least one formation comprising a first recess and a second recess;
a memory system for storing program instructions;
a processing system for executing the program instructions;
a transmission system for communicating with at least one communication system, wherein the at least one communication system comprises or cooperates with a positioning system for positioning the mobile data processing device;
wherein the transmission system is configured to send at least one alert signal in response to fulfillment of a first set of predetermined alert conditions;
an attachment base configured to move between a first position and a second position with respect to the at least one formation of the enclosure in response to an external force, wherein the attachment base is configured to move between the first position and the second position when the external force exceeds a first threshold pulling the enclosure away from the attachment base, a first portion of the attachment base being external to the enclosure and a second portion of the attachment base being internal to the enclosure, the attachment base comprising at least one spring that is configured to engage the first recess of the at least one formation of the enclosure in the first position and the second recess of the at least one formation of the enclosure in the second position in response to the external force;
a tag removably attached to the attachment base for suspending the mobile data processing device from a garment, lanyard, or strap that is wearable by a user, wherein the tag comprises a latch configured to open when the external force pulling the tag away is greater than a second threshold, and wherein the tag is configured to be detached from the attachment base when the external force pulling the tag away from the attachment base exceeds the second threshold, and wherein the second threshold is greater than the first threshold;
a detector system for detecting removal of the attachment base from the first position, wherein the detector system comprises circuitry and a sensor that is configured to detect when the at least one spring of the attachment base repositions from the first recess and the second recess of the at least one formation of the enclosure; and
an alert signal generator having an input coupled to the detector system and an output coupled to the transmission system, wherein the alert signal generator is configured to detect an alert condition and thereby cause transmission of at least one alert signal in response to a detected removal of the attachment base from the first position, wherein the alert signal generator is further configured to continuously detect the alert condition if the attachment base is completely detached from the enclosure.

2. The mobile data processing device according to claim 1, further comprising a reception system for receiving messages.

3. The mobile data processing device according to claim 2, further comprising a display system for displaying the received messages.

4. The mobile data processing device according to claim 1, further comprising a sleep mode circuitry for putting the mobile data processing device to a power save mode in response to fulfillment of a second set of predetermined conditions.

5. The mobile data processing device according to claim 4, further comprising a wake-up circuitry for putting the mobile data processing device to active mode in response to fulfillment of a third set of predetermined conditions.

6. The mobile data processing device according to claim 4, wherein the sleep mode circuitry is configured to control power to the reception system, wherein after sending the at least one alert signal, the sleep mode circuitry keeps the reception system powered until an acknowledgement to the at least one alert signal is received.

7. The mobile data processing device according to claim 1, wherein the mobile data processing device with the attachment base in the second position is visually different from the mobile data processing device with the attachment base in the first position.

8. The mobile data processing device according to claim 7, wherein the first position and the second position constitute local energy minima for the attachment base, and there is at least one local energy maximum between the first position and the second position.

9. The mobile data processing device according to claim 8, wherein the detector system does not detect said removal of the attachment base from the first position before the attachment base has proceeded beyond the local energy maximum.

10. The mobile data processing device according to claim 1, wherein the enclosure, when suspended from the attachment base, has a horizontal width which is between 4 cm and 10 cm.

11. The mobile data processing device according to claim 1, wherein the mobile data processing device is configured to resist pulling of the attachment base from the first position to the second position by a first force which is between 15 N and 35 N.

12. The mobile data processing device according to claim 11, wherein the first force is between 20 N and 28 N.

13. The mobile data processing device according to claim 11, wherein the mobile data processing device is configured to resist detachment of the attachment base from the enclosure by a second force which is greater than the first force and between 40 N and 60 N.

14. The mobile data processing device according to claim 13, wherein the second force is 50 N.

15. The mobile data processing device according to claim 1, further comprising structural elements dimensioned in such a manner that the mobile data processing device withstands, without: breaking or detecting removal of the attachment base from the first position, a force of at least 150 N acting on the attachment base and in parallel with a normal of a largest surface of the enclosure, against: a corresponding counterforce acting on the largest surface of the enclosure.

16. The mobile data processing device according to claim 1, wherein the positioning system uses observations of signal strength in the communication system to position the mobile data processing device.

17. The mobile data processing device according to claim 1, wherein the attachment base further comprises an elongated shaft that extends into the enclosure, the elongated shaft comprising a magnet that is positioned adjacent to the sensor of the detector system when then attachment base is in the first position,
wherein the sensor of the detector system is a Hall-effect sensor that is configured to detect a change in a magnetic field of the magnet of the elongated shaft of the attachment base, the change in the magnetic field of the magnet of the elongated shaft from the first position to the second position causing the transmission of the at least one alert signal.

18. A device for mobile data processing, the device comprising an attachment base, an enclosure, a tag, a processor, and a memory storing computer instructions executable by the processor, wherein the memory with the computer instructions and the processor are configured to cause the device to at least:
(a) transmit an alert signal in response to the attachment base moving from a first position to a second position relative to at least one formation of the enclosure, wherein movement of the attachment base occurs when an external force exceeding a first threshold pulls the attachment base away from the enclosure,
wherein each of the at least one formation of the enclosure comprises a first recess and a second recess,
wherein a first portion of the attachment base is external to the enclosure and a second portion of the attachment base being internal to the enclosure, the attachment base comprising at least one spring that is configured to engage the first recess of the at least one formation of the enclosure in the first position and the second recess of the at least one formation of the enclosure in the second position in response to the external force,
the device further comprising a detector circuit having a sensor that is configured to detect when the at least one spring of the attachment base repositions from the first recess and the second recess of the at least one formation of the enclosure, and
wherein the tag is removably attached to the attachment base and is operable to detach from the attachment base when the external force exceeding a second threshold pulls the tag and the attachment base away from the enclosure, and wherein the second threshold is greater than the first threshold, wherein the tag comprises a latch configured to open when the external force pulling the tag away is greater than the second threshold.

19. The device for mobile data processing according to claim 18, wherein the attachment base further comprises an elongated shaft that extends into the enclosure, the elongated shaft comprising a magnet that is positioned adjacent to the sensor of the detector circuit when then attachment base is in the first position,
wherein the sensor of the detector circuit is a Hall-effect sensor that is configured to detect a change in a magnetic field of the magnet of the elongated shaft of the attachment base, the change in the magnetic field of the magnet of the elongated shaft from the first position to the second position causing the transmission of the alert signal.

* * * * *